United States Patent [19]
Reinschmidt

[11] Patent Number: 5,832,294
[45] Date of Patent: Nov. 3, 1998

[54] MULTIPLE-MICROPROCESSOR MODULE

[75] Inventor: Robert M. Reinschmidt, Los Gatos, Calif.

[73] Assignee: MicroModule Systems, Cupertino, Calif.

[21] Appl. No.: 696,320

[22] Filed: Aug. 13, 1996

Related U.S. Application Data

[63] Continuation of Ser. No. 298,403, Aug. 30, 1994, abandoned.

[51] Int. Cl.$^6$ .......................................................... G06F 13/00
[52] U.S. Cl. ...................................... 395/800.32; 395/282
[58] Field of Search ...................................... 395/800, 775, 395/825, 833–835, 840, 282, 311, 442, 497.01, 280, 182.03, 182.08, 800.01, 800.32, 800.34, 800.39, 800.43; 364/131–134; 371/8.1, 11.1, 11.3, 10.2, 68.1

[56] References Cited

U.S. PATENT DOCUMENTS

| | | | |
|---|---|---|---|
| 5,083,259 | 1/1992 | Maresh et al. | 395/306 |
| 5,276,864 | 1/1994 | Hernandez et al. | 395/182.08 |
| 5,297,272 | 3/1994 | Lu et al. | 395/500 |
| 5,432,913 | 7/1995 | Smits et al. | 395/700 |
| 5,437,041 | 7/1995 | Wakabayashi et al. | 395/800 |
| 5,485,585 | 1/1996 | Huynh et al. | 395/311 |
| 5,535,414 | 7/1996 | Burge | 395/827 |

OTHER PUBLICATIONS

Pentium™ Family User's Manual, vol. 2, Chapters 1, 9, 10, 12, and 16, Intel Corporation, (1994).

82430NX PCIset Design Guide for the Pentium™ Processor at iCOMP™ Index 735/90 MHz and Pentium Processor at iCOMP Index 815/100 MHz, Chapters 1–3, Intel Corporation, (1994).

*Primary Examiner*—Alpesh M. Shah
*Attorney, Agent, or Firm*—Fish & Richardson P.C.

[57] ABSTRACT

A dual-microprocessor module includes two microprocessors each of a kind which has two selectable modes of operation, an independent mode in which it can operate independently and a cooperative mode in which it can cooperate with another microprocessor when interconnected in a predefined way with the other microprocessor. Conductors interconnect the microprocessors in the predefined way for operation in the cooperative mode. A housing supports the microprocessors and the conductors. An array of pins are used to mount the module in a socket on a circuit board and the pins are connected to the microprocessors. A socket/circuit board combination includes a socket having an array of holes for receiving pins of a microprocessor package. The holes are connected to runs on the circuit board, the array of holes and the runs being organized to accept either a package containing a single microprocessor or a package containing dual microprocessors interconnected to permit them to operate cooperatively, without requiring rewiring of the circuit board.

14 Claims, 10 Drawing Sheets

FIG. 4A

| COLUMN 1 | 2 | 3 | 4 | 5 | 6 | 7 | 8 | 9 |
|---|---|---|---|---|---|---|---|---|
| SIGNAL NAME | # of PINS | PGA PIN | PIN TYPE | DRIVER TYPE | Rcvr TYPE | CPU1 | CPU2 | FUNCTION |
| A03-A21 | 19 | (1) | B | XD4/XD4a | XR8 | 1 | 1 | Address |
| A22-A31 | 10 | (1) | I | XD3 | XR7 | 1 | 1 | Address |
| A20M# | 1 | AK08 | I | | XR6 | 1 | 1 | Address Bit 20 Mask |
| ADS# | 1 | AJ05 | B | XD4/XD4a | | 1 | 1 | Address Strobe |
| ADSC# | 1 | AM02 | O | XD3 | | 1 | 1 | Address Strobe |
| AHOLD | 1 | V04 | I | | XR5 | 1 | 1 | Address Hold |
| AP | 1 | AK02 | B | XD3 | XR6 | 1 | 1 | Address Parity |
| APCHK#_C | 1 | AE05 | O | XD1 | | 1 | | Address Parity Check Status |
| APCHK#_CM | 1 | AH10 | O | XD1 | | | 1 | Address Parity Check Status |
| BE0#-BE3# | 4 | (1) | B | XD3 | | 1 | 1 | Byte Enable [APICID] |
| BE4#-BE7# | 4 | (1) | O | XD3 | | 1 | 1 | Byte Enable |
| [BF] | 1 | Y33 | I | | XR6 | 1 | 1 | Bus to Core Frequency Radio |
| BOFF# | 1 | Z04 | I | | XR5 | 1 | 1 | Back-Off |
| BP2_C | 1 | S03 | O | XD1 | | 1 | | Breakpoint 2 |
| BP2_CM | 1 | F20 | O | XD1 | | | 1 | Breakpoint 2 |
| BP3_C | 1 | S05 | O | XD1 | | 1 | | Breakpoint 3 |
| BP3_CM | 1 | AH18 | O | XD1 | | | 1 | Breakpoint 3 |
| BRDY# | 1 | X04 | I | | XR4 | 1 | 1 | Burst Ready |
| BRDYC# | 1 | Y03 | I | | XR3 | 1 | 1 | Burst Ready Cache |
| BREQ | 1 | AJ01 | O | XD2 | | 1 | 1 | Bus Request |
| BUSCHK#[PLDRV] | 1 | AL07 | I | | XR4 | 1 | 1 | Bus Check |
| CACHE# | 1 | U03 | B | XD3 | | 1 | 1 | Internal Cacheability/Write Back |
| CLK | 1 | AK18 | I | | XR4 | 1 | 1 | Clock |
| (CPUTYPE_C) | 1 | Q35 | I | | XR1 | 1 | | CPU Type |
| (CPUTYPE_CM) | 1 | AH28 | I | | XR1 | | 1 | CPU Type |
| D00-D63 | 64 | (1) | B | XD3 | XR6 | 1 | 1 | Data |
| DP0-DP7 | 8 | (1) | B | XD3 | XR6 | 1 | 1 | Data Parity |
| D/C# | 1 | AK04 | B | XD3 | | 1 | 1 | Data/Code |
| EADS# | 1 | AM04 | I | | XR5 | 1 | 1 | External Address Strobe |
| EWBE# | 1 | W03 | I | | XR5 | 1 | 1 | External Write-back Buffer Empty |
| FERR# | 1 | Q05 | O | XD2 | | 1 | 1 | Floating Point Error |
| FLUSH# | 1 | AN07 | I | | XR6 | 1 | 1 | Cache Flush |
| FRCMC#_C | 1 | Y35 | I | | XR2 | 1 | | Functional Redundancy Checking |
| FRCMC#_CM | 1 | F28 | I | | XR2 | | 1 | Functional Redundancy Checking |
| HIT# | 1 | AK06 | B | XD2 | | 1 | 1 | Hit |
| HITM# | 1 | AL05 | B | XD4/XD4a | | 1 | 1 | Hit to a Modified Line |
| HLDA | 1 | AJ03 | B | | | 1 | 1 | Bus Hold Acknowledge |
| HOLD | 1 | AB04 | X | | XR6 | 1 | 1 | Hold |
| IERR#_C | 1 | P04 | O | XD1 | | 1 | | Internal Error |
| IERR#_CM | 1 | F14 | O | XD1 | | | 1 | Internal Error |
| IGNNE# | 1 | AA35 | I | | XR6 | 1 | 1 | Ignore Numeric Error |
| INIT(SLFTST) | 1 | AA33 | I | | XR6 | 1 | 1 | Initialization |
| INTR/LINT0_C | 1 | AD34 | I | | XR2 | 1 | | Maskable Interrupt |
| INTR/LINT0_CM | 1 | AH20 | I | | XR2 | | 1 | Maskable Interrupt |
| INV | 1 | U05 | I | | XR5 | 1 | 1 | Invalidation |
| KEN# | 1 | W05 | I | | XR5 | 1 | 1 | Cache Enable |
| LOCK# | 1 | AH04 | B | XD3 | | 1 | 1 | Bus Lock |
| M/IO# | 1 | T04 | B | XD3 | | 1 | 1 | Memory/Input-Output |
| NA# | 1 | Y05 | I | | XR7 | 1 | 1 | Next Address |
| NC | 19 | (1) | | | | | | No Connection-Leave Unconnected |

FIG. 4B

| COLUMN 1 | 2 | 3 | 4 | 5 | 6 | 7 | 8 | 9 |
|---|---|---|---|---|---|---|---|---|
| SIGNAL NAME | # of PINS | PGA PIN | PIN TYPE | DRIVER TYPE | Rcvr TYPE | CPU1 | CPU2 | FUNCTION |
| NMI/LINT1_C | 1 | AC33 | I | | XR2 | 1 | | Non-Maskable Interrupt |
| NMI/LINT1_CM | 1 | AH22 | I | | XR2 | | 1 | Non-Maskable Interrupt |
| PBGNT# | 1 | AD04 | B | XD2 | XR6 | 1 | 1 | APIC Bus Grant |
| PBREQ# | 1 | AE03 | B | XD2 | XR6 | 1 | 1 | APIC Bus Request |
| PCD | 1 | AG05 | O | XD3 | | 1 | 1 | Page Cache Disable |
| PCHK#_C | 1 | AF04 | O | XD1 | | 1 | | Parity Check |
| PCHK#_CM | 1 | AH12 | O | XD1 | | | 1 | Parity Check |
| PEN# | 1 | Z34 | I | | XR6 | | 1 | Parity Enable |
| PHIT# | 1 | AA03 | B | XD2 | XR6 | 1 | 1 | APIC Hit |
| PHITM# | 1 | AC03 | B | XD2 | XR6 | 1 | 1 | APIC Hit Modified Line |
| PICCLK | 1 | H34 | I | | XR4 | 1 | 1 | APIC Bus Clock |
| PICD0[DPEN#] | 1 | J33 | B | XD2 | XR6 | 1 | 1 | APIC Data 0 (open drain) |
| PICD1[APICEN] | 1 | L35 | B | XD2 | XR6 | 1 | 1 | APIC Data 1 (open drain) |
| PM0/BP0_C | 1 | Q03 | O | XD1 | | 1 | | Perf. Monitor 0 /Breakpoint 0 |
| PM0/BP0_CM | 1 | F16 | O | XD1 | | | 1 | Perf. Monitor 0 /Breakpoint 0 |
| PM1/BP1_C | 1 | R04 | O | XD1 | | 1 | | Perf. Monitor 1 /Breakpoint 1 |
| PM1/BP1_CM | 1 | F18 | O | XD1 | | | 1 | Perf. Monitor 1 /Breakpoint 1 |
| PRDY_C | 1 | AC05 | O | XD1 | | 1 | | Probe Mode and Ready |
| PRDY_CM | 1 | AH14 | O | XD1 | | | 1 | Probe Mode and Ready |
| PWT | 1 | AL03 | O | XD3 | | 1 | 1 | Page Write Through |
| R/S#_C | 1 | AC35 | I | | XR2 | 1 | | Run/Stop |
| R/S#_CM | 1 | AH24 | I | | XR2 | | 1 | Run/Stop |
| RESET_C | 1 | AK20 | I | | XR2 | 1 | | Reset |
| RESET_CM | 1 | AH30 | I | | XR2 | | 1 | Reset |
| SCYC | 1 | AL17 | B | XD3 | | 1 | 1 | Split Cycle |
| SMI#_C | 1 | AB34 | I | | XR2 | 1 | | System Management Interrupt |
| SMI#_CM | 1 | AH26 | I | | XR2 | | 1 | System Management Interrupt |
| SMIACT#_C | 1 | AG03 | O | XD1 | | 1 | | System Mgt. Interrupt Active |
| SMIACT#_CM | 1 | AH16 | O | XD1 | | | 1 | System Mgt. Interrupt Active |
| STPCLK# | 1 | V34 | I | | XR6 | 1 | 1 | Stop Clock |
| TCK | 1 | M34 | I | | XR4 | 1 | 1 | Testability Clock |
| TDI_C | 1 | N35 | I | | XR2 | 1 | | Test Data Input |
| TDI_CM | 1 | F22 | I | | XR2 | | 1 | Test Data Input |
| TDO_C | 1 | F24 | O | XD1 | | 1 | | Test Data Output |
| TDO_CM | 1 | N33 | O | XD1 | | | 1 | Test Data Output |
| TMS_C | 1 | P34 | I | | XR2 | 1 | | Test Mode Select |
| TMS_CM | 1 | F26 | I | | XR2 | | 1 | Test Mode Select |
| TRST# | 1 | Q33 | I | | XR4 | 1 | 1 | Test Reset |
| U/O#_C | 1 | AE35 | O | XD1 | | 1 | | Upgrade or OEM Processor |
| W/R# | 1 | AM06 | B | XD4/XD4a | | 1 | 1 | Write/Read |
| WB/WT# | 1 | AA05 | I | | XR5 | 1 | 1 | WriteBack/WriteThrough |
| VCC5A | 2 | AN01 | | | | | | Not-Used |
| VCC5B | 2 | AN03 | | | | | | Not-Used |

Note(1) – Refer to PIN TABLE on page 5 for PGA pin assignments.

Note(2) – Signals containing square brackets [ ] in their names are sampled at RESET(refer to RESET CONFIGURATION CONTROL on page 8).

| COLUMN 1 | 2 | 3 | 4 | 5 | 6 |
|---|---|---|---|---|---|
| CONTROL PIN NAME | PGA PIN | DP STATE | M/C STATE | CHIP | PIN ACTIVE FUNCTION AT "RESET" |
| [BF] | Y33 | Open | Open | CPU1, CPU2 | Bus to core Frequency Ratio (Open=2/3) |
| BE0#[ID24]-BE3#[ID27] | AL07 | • | • | CPU1, CPU2 | APIC ID code |
| BUSCHK#[PLDRV] | | • | • | CPU1, CPU2 | Processor Low Drive |
| [CPUTYPE_C] | Q35 | L | • | CPU1 | CPU Type |
| [CPUTYPE_CM] | AH28 | H | • | CPU2 | CPU Type |
| [FRCMC#_C] | Y35 | H | H | CPU1 | Functional Redundancy Checking M/C |
| [FRCMC#_CM] | F28 | H | L | CPU2 | Functional Redundancy Checking M/C |
| INIT[SLFTST] | AA33 | • | • | CPU1, CPU2 | Processor Self-Test |
| PICD0[DPEN#] | J33 | • | • | CPU1, CPU2 | Dual Processor Mode Enable |
| PICD1[APICEN] | L35 | • | • | CPU1, CPU2 | APIC Enable |

*User Option. Refer to the Intel Pentium™ Processor User's Manual, for more information on RESET configuration.

| RECEIVER TYPE | CP1 (pF) MIN | CP1 (pF) MAX | LX1 (nH) MIN | LX1 (nH) MAX | RX1 (Ohms) MIN | RX1 (Ohms) MAX | CX1 (pF) MIN | CX1 (pF) MAX |
|---|---|---|---|---|---|---|---|---|
| XR1 | 1.5 | 4.7 | 5.3 | 13.1 | 0.5 | 2.0 | 1.3 | 4.0 |
| XR2 | 1.5 | 4.7 | 5.3 | 13.1 | 0.5 | 2.0 | 2.4 | 6.3 |
| XR3 | 2.7 | 5.6 | 8.7 | 15.3 | 2.1 | 3.1 | 4.5 | 6.0 |
| XR4 | 2.7 | 5.6 | 8.7 | 15.3 | 2.1 | 3.1 | 3.5 | 7.4 |
| XR5 | 2.7 | 5.6 | 8.7 | 15.3 | 2.1 | 3.1 | 6.9 | 9.4 |
| XR6 | 2.7 | 5.6 | 8.7 | 15.3 | 2.1 | 3.1 | 5.7 | 12.0 |
| XR7 | 2.7 | 5.6 | 8.7 | 15.3 | 2.1 | 3.1 | 10.1 | 13.6 |
| XR8 | 2.7 | 5.6 | 8.7 | 15.3 | 2.1 | 3.1 | 27.1 | 36.6 |

FIG. 7D

| RECEIVER TYPE | Tr/Tf (ns) MIN | Tr/Tf (ns) MAX | R0 (Ohms) MIN | R0 (Ohms) MAX | CX2 (pF) MIN | CX2 (pF) MAX | LX2 (nH) MIN | LX2 (nH) MAX | RX2 (Ohms) MIN | RX2 (Ohms) MAX | CP2 (pF) MIN | CP2 (pF) MAX |
|---|---|---|---|---|---|---|---|---|---|---|---|---|
| XD1 | 1.1 | 2.7 | 16.6 | 60.0 | 4.0 | 6.3 | 5.3 | 13.1 | 0.5 | 2.0 | 1.5 | 4.7 |
| XD2 | 1.1 | 2.7 | 16.6 | 60.0 | 8.9 | 12.0 | 8.7 | 15.3 | 2.1 | 3.1 | 2.7 | 5.6 |
| XD3 | 0.5 | 3.0 | 17.5 | 53.0 | 8.5 | 12.0 | 8.7 | 15.3 | 2.1 | 3.1 | 2.7 | 5.6 |
| XD4 | 0.9 | 2.4 | 9.0 | 22.4 | 25.9 | 36.6 | 8.7 | 15.3 | 2.1 | 3.1 | 2.7 | 5.6 |
| XD4a | 0.7 | 1.8 | 4.6 | 12.9 | 25.9 | 36.6 | 8.7 | 15.3 | 2.1 | 3.1 | 2.7 | 5.6 |

MULTIPLE-MICROPROCESSOR MODULE

This is a continuation of application Ser. No. 08/298,403, filed Aug. 30, 1994, now abandoned.

BACKGROUND OF THE INVENTION

This invention relates to multiple-microprocessor modules.

A microprocessor die is typically housed in a protective package containing an array of pins designed for mounting in a corresponding array of holes in a socket of a printed circuit board ("PCB"). The arrays of pins and holes carry power and signals (e.g., address, control, status, and data bytes) between the microprocessor and circuitry on the PCB.

Intel's recently released 3.3 V, 32-bit Pentium™ microprocessor, for example, is available in a standard 296-pin package, and is expected to become available also in a 320-pin Pentium Overdrive™ package, as described in the *Pentium™ Processor User's Manual*, vol. 1 (1994), incorporated by reference. The pin assignments for these two packages are nearly identical, except that the Pentium Overdrive™ package contains additional voltage, ground, and no-connect pins to allow for higher power consumption. The Pentium™ package is designed to operate in a dual-processor (DP) mode in which two microprocessors housed in separate packages and mounted in two separate, electrically connected sockets can cooperate. If a Pentium package is in place in the first socket and a Pentium Overdrive package is inserted in the second socket, the processor in the first socket is shut off. If a Pentium package is inserted in the second socket the two Pentium packages cooperate in the DP mode.

SUMMARY OF THE INVENTION

In general, in one aspect, the invention features a dual-microprocessor module. The module includes two microprocessors each of a kind which has two selectable modes of operation, an independent mode in which it can operate independently and a cooperative mode in which it can cooperate with another microprocessor when interconnected in a predefined way with the other microprocessor. Conductors interconnect the microprocessors in the predefined way for operation in the cooperative mode. A housing supports the microprocessors and the conductors. An array of pins are used to mount the module in a socket on a circuit board and the pins are connected to the microprocessors.

Implementations of the invention may include the following features. The cooperative mode may entail dual processing with a shared bus, or functional redundancy checking. Each of the microprocessors may be an Intel Pentium microprocessor. The conductors may be part of a multilayer substrate. The array of pins may number 347 pins. The array may be arranged within an area defined between the outer boundary of a smaller rectangle and the inner boundary of a larger rectangle, and may include a subarray of pins that is identical in function, position, and spacing to the pins of a single Pentium microprocessor package. Some of the pins of the module may be connected only to one of the microprocessors and some other pins of the module may be connected only to the other one of the microprocessors. Each of the conductors which interconnect the microprocessors may also connect the microprocessors to one of the pins of the array.

In general, in another aspect, the invention features a socket/circuit board combination in which the socket has an array of holes for receiving pins of a microprocessor package. The holes are connected to runs on the circuit board, the array of holes and the runs being organized to accept either a package containing a single microprocessor or a package containing dual microprocessors interconnected to permit them to operate cooperatively, without requiring rewiring of the circuit board. In implementations of the invention, the array of holes may number 347 and be organized to accept either a single Pentium microprocessor package or a dual-Pentium microprocessor module.

Among the advantages of the invention are that it enables dual Pentium microprocessors to be housed in a single package essentially no larger than a single Pentium package. A single socket can be used to mount either the dual-processor package or a single processor package, interchangeably. The dual processors in the single package may be operated in dual processor mode using only half the "real estate" on the circuit board.

Other advantages and features will become apparent from the following description and from the claims.

BRIEF DESCRIPTION OF THE INVENTION

FIGS. 1A, 1B, and 1C are schematic perspective views, respectively, of (a) a dual-microprocessor module, two microprocessor packages, and a socket; (b) the module mounted in a socket; and (c) two microprocessor packages mounted in two sockets.

FIGS. 2A, 2B, 2C, 2D, and 3 are, respectively, an exploded perspective view, a pin-side schematic view, a side-sectional (at 1C—1C of FIG. 2A) view, a wiring diagram, and a pin-side schematic view of a dual-microprocessor module.

FIGS. 4A and 4B are tables of pin assignments of the module.

FIG. 5 is a table of the RESET control pin functions.

FIGS. 7A, 7B, 7C, and 7D are, respectively, pin driver and pin receiver circuits, and tables of driver and receiver electrical components.

DETAILED DESCRIPTION OF THE INVENTION

Figure 1A:
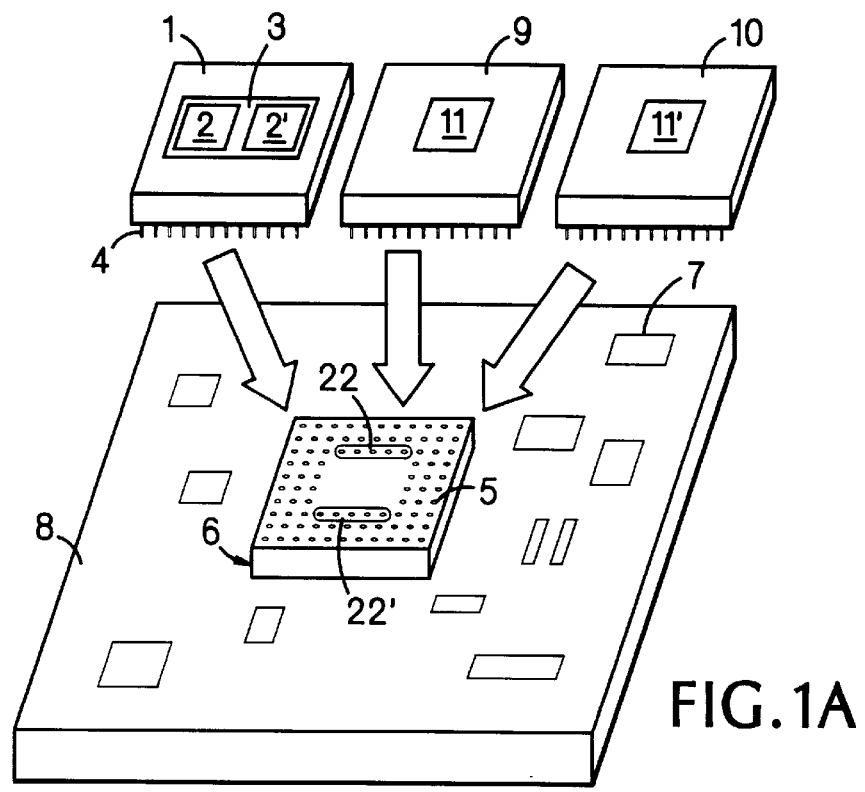

Referring to FIG. 1A, a dual-microprocessor module 1 contains two 3.3 V Pentium microprocessor dies 2, 2' which are connected to each other to a 347-pin grid array ("PGA") 4 via an interconnection substrate 3. The PGA 4 is configured for insertion into a 347-hole array 5 of a socket 6 mounted on a PCB 8. PCB 8 also supports other components 7 in the space surrounding socket 6. The same socket 6 can also be used to mount a standard 296-pin package 9 containing a single Pentium™ microprocessor 11, or a 320-pin Pentium Overdrive™ package 10 containing a Pentium™ microprocessor 11'.

In all three cases, the outer perimeter pins (defined below) of the pin grid array are inserted into the outer perimeter holes of the hole array 5. When mounted in the socket 6, the single-microprocessor packages 9, 10 leave a number of unoccupied holes (i.e., 51 for the Pentium™ package 9, and 27 for the Pentium Overdrive™ package 10) in two regions 22, 22' of the hole array 5. In general, unoccupied holes in these regions are biased, grounded, or adapted to receive signals generated by the second microprocessor die 2' when the dual-microprocessor module 1 is inserted in the socket; these holes are not needed for the single-microprocessor package. A single socket therefore allows different packages of Pentium™ processors (single Pentium™, Pentium™-Overdrive, dual-Pentium™) to be used to take advantage of different modes of operation (e.g., standard or DP modes).

Figure 1B:
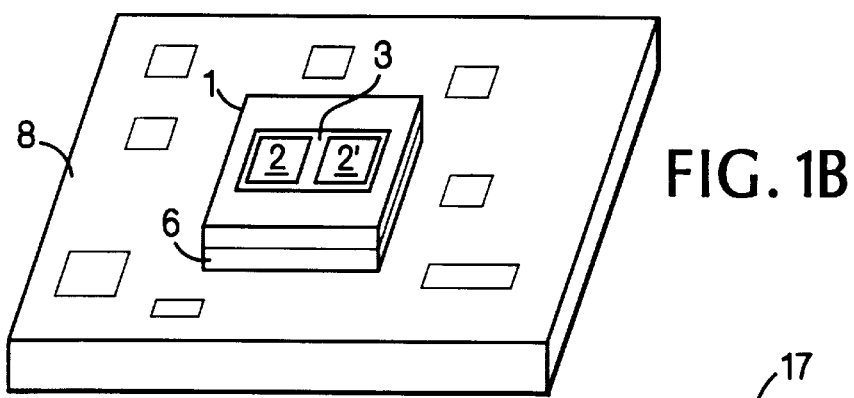
Figure 1C:
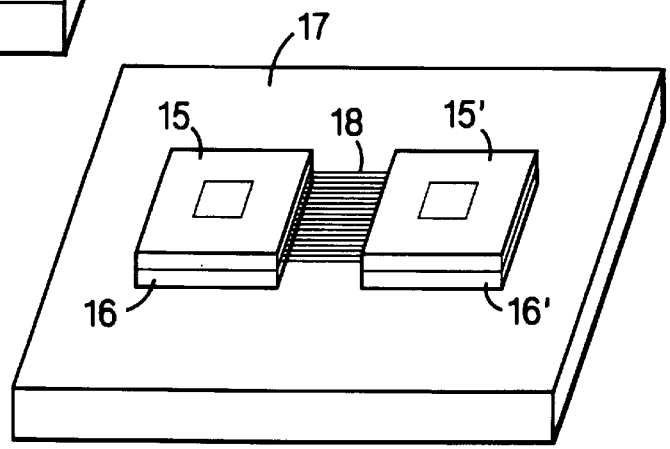

Referring to FIGS. 1B and 1C, mounting a dual-microprocessor module 1 in a single socket 6 has at least two major advantages compared with the known way of mounting two single-microprocessor packages 15, 15' in separate sockets 16, 16'. One is that the many interconnecting runs needed for electrical connection in the two-socket cases are handled within package 1 in the single socket case and therefore are eliminated from the PCB. The other is that the "real estate" used on the PCB board is cut in half.

Generally, for the dual-microprocessor module 1 to function in the DP mode, individual contact pads contained on each Pentium198 microprocessor die 2, 2' require one of three types of electrical connections, each of which is defined in the Pentium™ User's manual. The pads categorized as "must be connected" are internally connected between the two microprocessors by the runs in substrate 3. Remaining pads in each microprocessor, categorized as "may be connected" and "must not be connected", are connected directly to signal pins on the PGA.

Figure 2A:
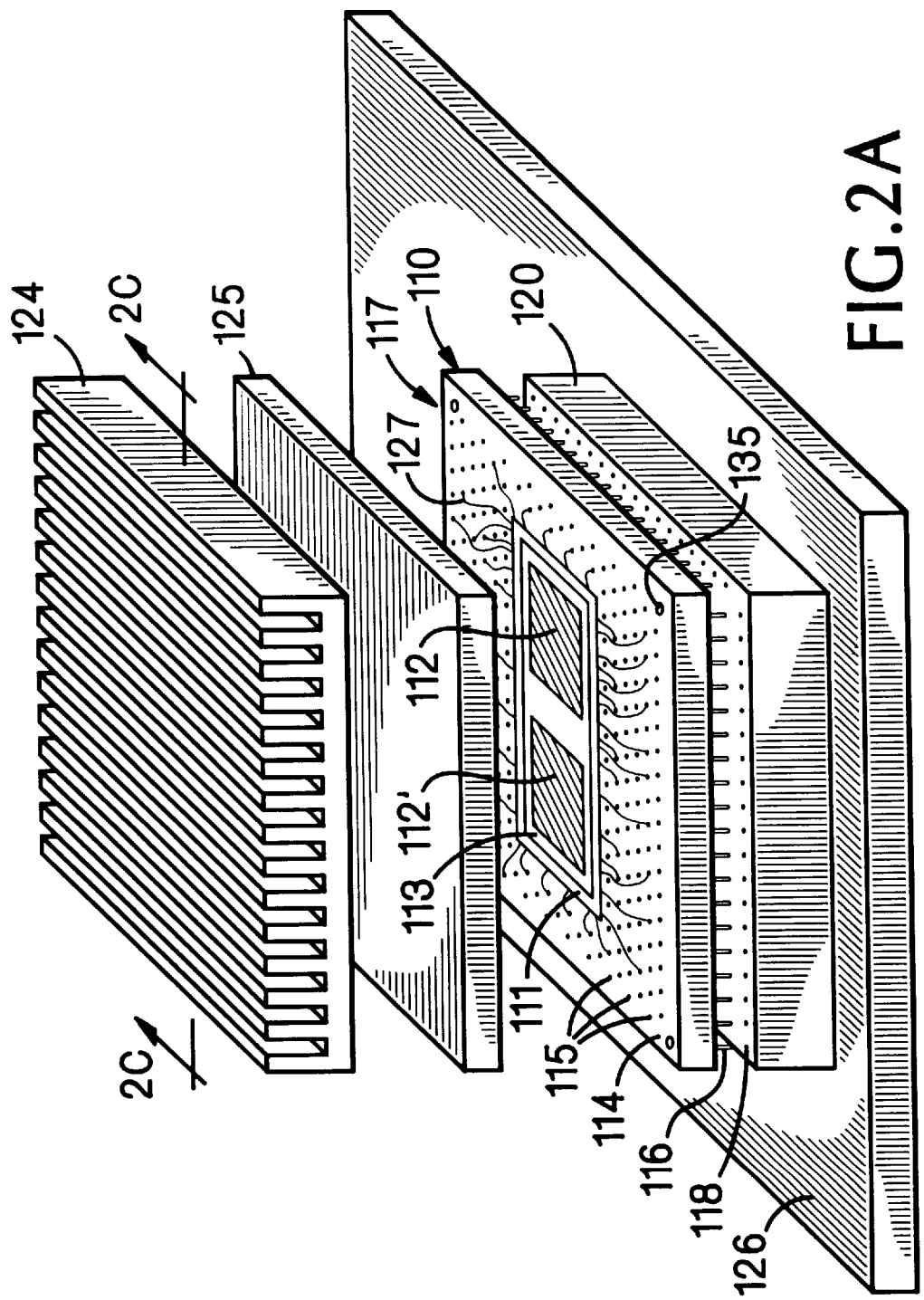
Figure 2B:
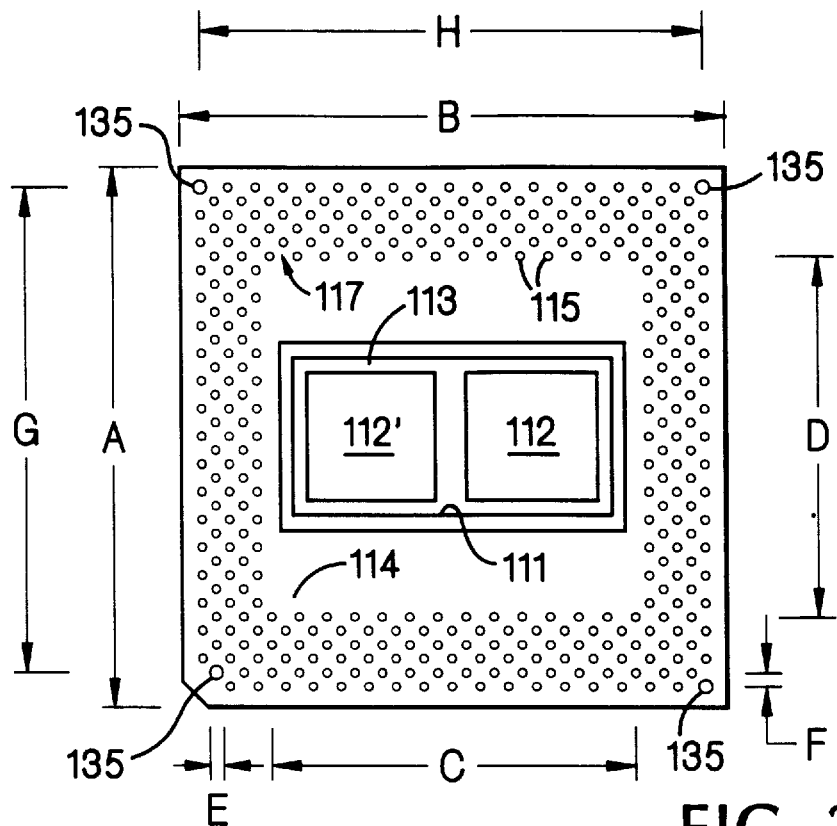
Figure 2C:
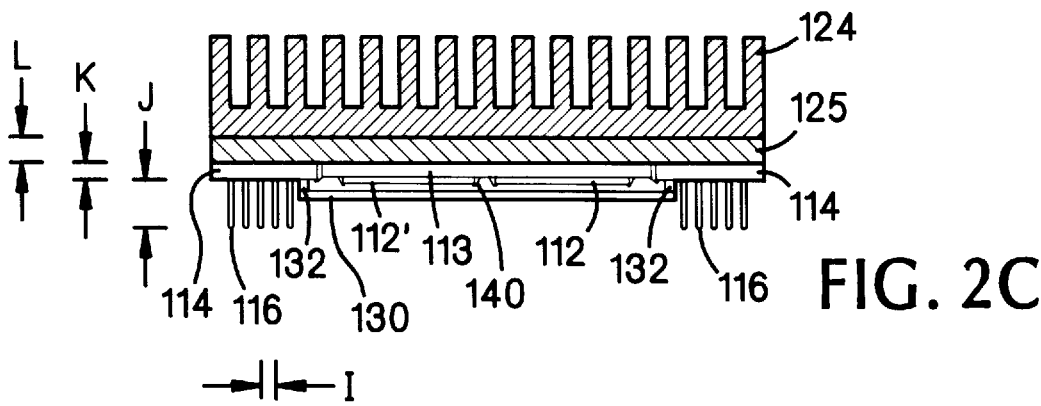

Referring to FIGS. 2A, 2B and 2C, dual-microprocessor module 110 contains two Pentium™ microprocessor dies 112, 112' mounted on a high-density MCM-D (multi-chip module) substrate 113 which is mounted in a cut-out center of a PCB laminate base 114. Runs 127 formed on the surface of the PCB laminate base 114 provide electrical connections between the substrate 113 and the top ends 115 of pins 116 arranged in a PGA 117. The PGA 117 is inserted in a matched hole array 118 of a commercially available, interstitial, single-layer socket 120 (Amp, model number MDD-0101) mounted on a PCB 126 (e.g., a computer mother board). A lid frame 132, having a cut-out center portion, attaches to a lid 130 which forms the bottom surface of the dual-microprocessor module 110 and electrically isolates the PCB laminate base 114 from the PCB 126. A baseplate 125 and a heat sink 124 (both made of aluminum or other heat-dissipating materials) are attached to the dual-microprocessor module 110 using ceramic standoffs 135.

Figure 3:
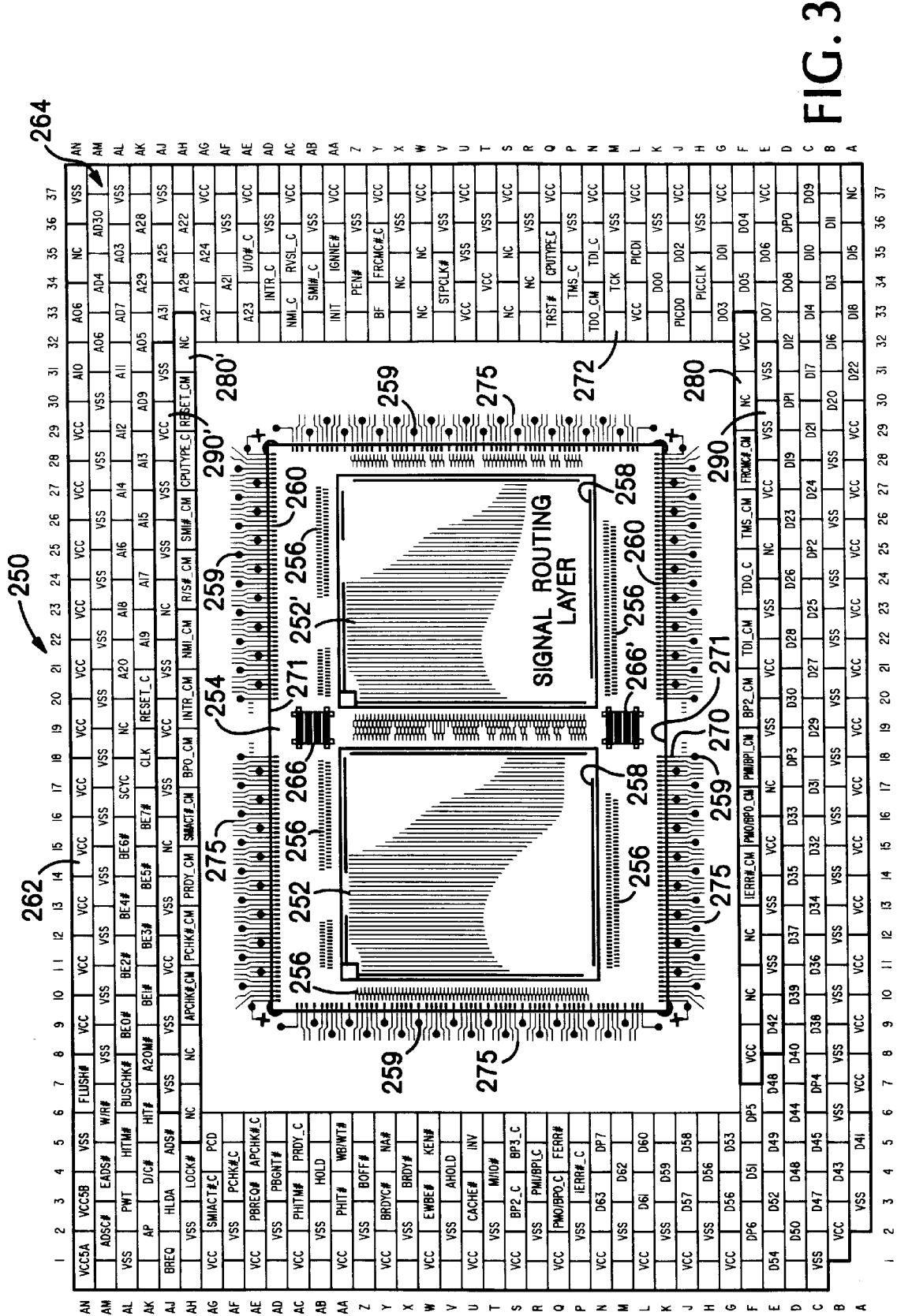

Referring to FIG. 3, the Pentium™ microprocessor dies 252, 252' mounted on the MCM-D substrate 254 contain a first array of contact pads 258 which electrically connect via wires to contact pads 256 located on the substrate 254. In this manner, the substrate 254 allows electrical connections to be made between the two microprocessor dice 252, 252', and between the dies and a second array of contact pads 260 located on the outer perimeter of the substrate 254. Contact pads 260 are connected by a series of wires 270 to an array of electrical contacts 259 arranged around the perimeter 271 of a cut-out center of the PCB laminate base 272. The array of electrical contacts 259 are connected by runs (not shown) to individual pins (indicated by boxes 262) of the PGA 264. This allows the contact pads 258 of the two microprocessors 252, 252' to be wired to corresponding pins. Two low-inductance capacitors 266, 266' are also included on the substrate 254 to filter out any voltage spikes that may occur during powering of the module.

Figure 2D:
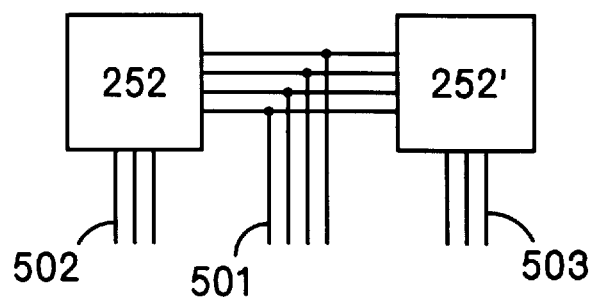

Referring also to FIG. 2D, each of the 296 contact pads in the contact pad array 258 of each of the Pentium microprocessor dice 252, 252' (mounted on a substrate 254) is electrically connected via the substrate either to a corresponding pin (indicated by the boxes 262) on the PGA 264 and/or to a corresponding pin on the other die 252', 252. There are 148 connections 501 each of which connects corresponding Address, Data, Clock, Status, or Control pads on the two microprocessors and also connects to one of the pins of the PGA. The label in each box 262 (FIG. 3) reflects the function of each pin in the dual-microprocessor module. For example, boxes labeled "VSS" and "NC" correspond to grounded and non-connected pins, respectively. "VCC" indicates that the pin is biased with a 3.3+/−5% V DC (at 5.2 mA) power supply. In total, there are 62 biased pins, 71 ground pins, 20 non-connected pins, and two pins (located at AN1 and AN2) which may be optionally connected to a 5 V power supply. All boxes 262 not labelled "_C" or "_CM" are connected to both of the microprocessors. Each box 262 having a label ending with a "_C" (or "_CM") suffix refers to the 20 (or 19) status and control signals wired directly from the PGA to either (but not both of) the first (or second) microprocessor. (The set of 20 signals is labeled 502 in FIG. 2D, and the set of 19 signals is labeled 503 in FIG. 2D.) The one exception is that the "TD0_C" and "TD0_CM" labels (used for pins located at F24 and N33, respectively) are reversed; this allows the pin labeled "TD0_CM" to be situated at a location equivalent to that of the "TD0"-labeled pin of a conventional, single-microprocessor Pentium™ package. This pin assignment allows two Pentium™ microprocessors in a single module to cooperate while allowing a single-microprocessor package to function in the same socket without requiring rewiring or added logic.

The remaining 156 pins (labeled, e.g., by "D42") correspond to address, data, clock, status, and control signals; these signals are described in the Pentium™ User's manual, cited above.

The PGA 264 of the dual-microprocessor module 250 contains 51 more pins (located at E9-E31, F8-F32, AH6-AH32, and AJ7-AJ31, and indicated by the sets of boxes 280, 280', 290, and 290') than the pin grid of a standard, 296-pin Pentium™ package. With the exception of the pin located at F24 (described above), these additional pins are connected to ground and power planes in the substrate, are non-connected, or are exclusively connected to the second microprocessor 252'. Similarly, the dual-microprocessor module contains 27 more pins (located at F8-F32 and AH6-AH32, and indicated by the boxes 280, 280') than the Pentium overdrive™ package. Except for the pins located in blocks 280, 280', 290, and 290', and pins AN1 and AN3, all other pins of the PGA are used by the Pentium Overdrive™; the standard Pentium™ and the dual Pentium™ module. By "perimeter pins" we mean all of these other pins.

Referring to FIGS. 4A and 4B, the function (col. 9) and signal name (col. 1) of each signal pin (col. 3) in the PGA is listed. Col. 2 lists the number of pins corresponding to the signal name, and col. 4 lists the pin type, i.e., input ("I"), output ("O"), or bi-directional ("B"). A "1" in cols. 7 or 8 indicates a connection between the pin and the first or second microprocessor, respectively. Col. 9 lists a brief description of the pin function, and cols. 5 and 6 list the types of driver and receiver circuitry forming the electrical paths between the pins and the substrate contact pads.

The dual-microprocessor module is designed to exhibit all the features associated with two Pentium™ microprocessors mounted in side-by-side sockets. For example, the two microprocessors in the module may operate in dual processor (DP) mode or Functional Redundancy Checking (FRC) mode, through external pin control; and the internal clock frequency for each microprocessor may be 1.5 times the input clock frequency at the pins of the dual-microprocessor module (e.g., 100 MHz vs. 66 MHz; or 90 MHz vs. 60 MHz). More information concerning these features is found in the Pentium™ User's manual cited above. Other IEEE standard functions, such as 1149.1 test access port and boundary scan architecture, are also supported by the dual-microprocessor module.

Referring to FIG. 5, configuration control over the dual-microprocessor module is accomplished by driving each of the configuration input pins (col. 2) of the PGA to the indicated state at the falling edge of the RESET input. The bracketed portion of the control pin name in col. 1 indicates the function of the pin at RESET. Col. 3 lists the states (i.e., high "H", low "L", or "Open") at RESET for the DP mode. Col. 4 lists the states for the FRC mode. Some of the pins in the figure have other I/O functions at RESET. In addition, as with the single Pentium™ package, all microprocessor internal caches (i.e., code and data caches, translational lookaside buffers, branch target buffers, and segment descriptor cache) in the DP mode are invalidated upon execution of the RESET function.

Figure 6:
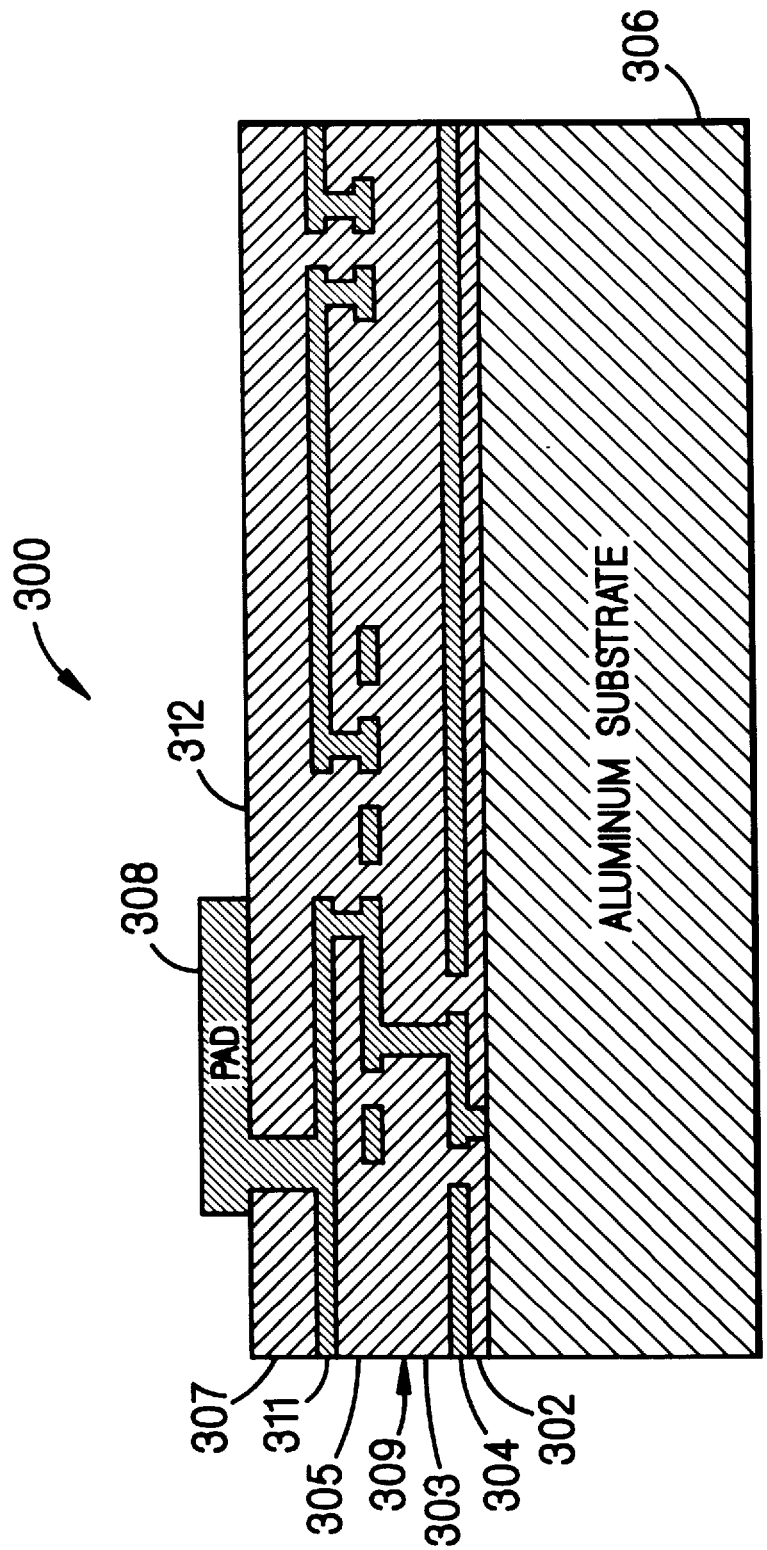
FIG. 6 is a schematic cross-sectional view of an interconnection substrate.

Referring to FIG. 6, the high-density multi-chip module "MCM-D") substrate 300 (available from MicroModule Systems located in Cupertino, Calif.) used to connect two microprocessors in the module has alternating layers of polyamide films 302, 303, 305, 307 (having thicknesses of between 3.5 and 12 μm) and metal films 304, 309, 311, (having thicknesses between 2 and 6 μm and containing copper, gold, or nickel) deposited on an aluminum substrate 306 having a thickness of about 50 mils. In order to provide electrical connections between the two microprocessors, metal pads 308 deposited on the surface of the substrate 300 are electrically connected to pads on the microprocessor dies, and are additionally connected to conformal vias 312 and routing planes 309 within the substrate 300. Metal layers 304 and 311 within the substrate 300 also provide the pads 308 with voltage sources and ground sources. Alternate substrates having multi-layer metal/laminate ("MCM-L") or metal/ceramic ("MCM-C") structures can also be used to mount the microprocessors.

Figure 7A:
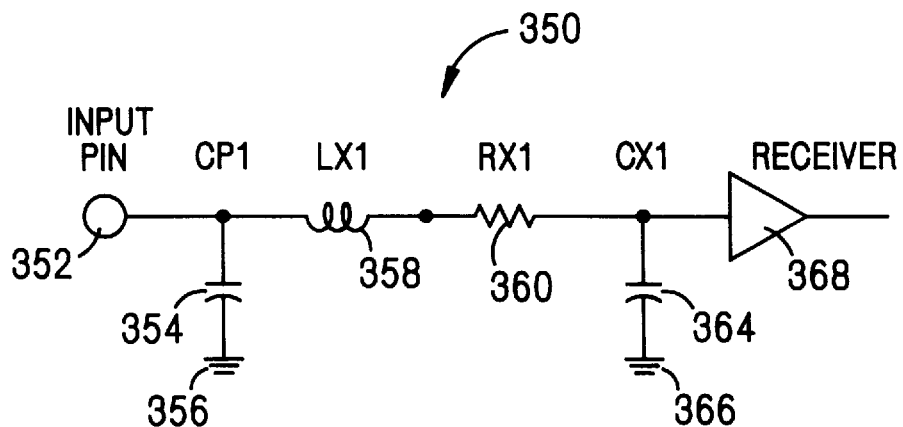
Figure 7B:
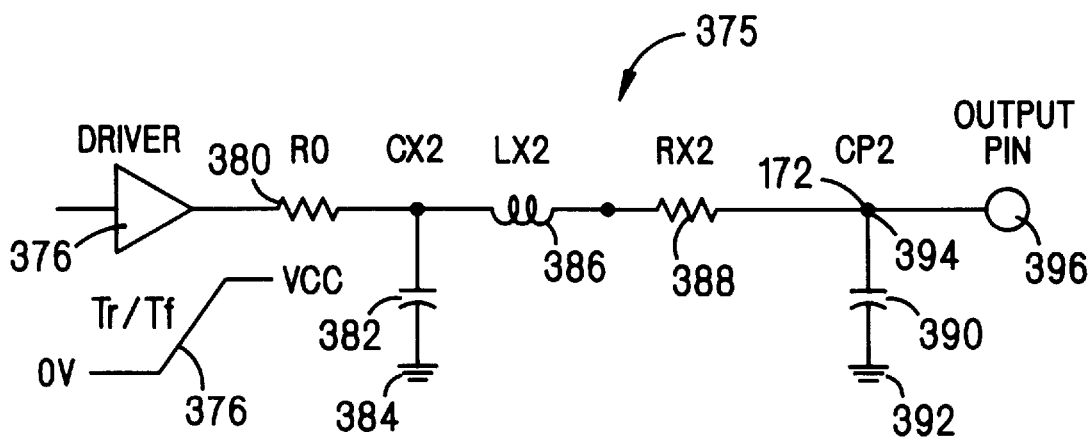

Referring to FIGS. 7A–7C, individual receiver 350 and driver 375 integrated circuits, each corresponding to the circuitry referred to in cols. 5 and 6 of FIGS. 4A and 4B, are shown schematically. The driver and receiver circuits are not made of discrete R-L-C components but rather of conductors which have the appropriate electrical characteristics.

In driver circuit 375, a waveform 376 (representing, e.g., the leading edge of an address signal) rises from 0 V to VCC with a time constant of $T_r/T_f$. During operation, the waveform 376 from driver 378 first passes through resistor 380 connected to capacitor 382 (wired to ground 384). These components are additionally connected to an inductor 386, which is connected in series to a second resistor 388 and a capacitor 390 (wired to ground 392). A junction 394 forming the connection between capacitor 390 and resistor 388 is connected to output pin 396 to complete the circuit.

Return signals sent from input pin 352 of the receiver circuit 350 pass through capacitor 354 (wired to ground 356), inductor 358, and resistor 360. Junction 362 connects the signal to a second capacitor 364 (wired to ground 366) and receiver amplifier 368.

Referring again to FIG. 2B, the dimensions of a dual-microprocessor module are listed in Table 1 below.

TABLE 1

Module Dimensions

| Component | Dimension (inches) |
|---|---|
| A | 1.950 +/− 0.005 |
| B | 1.950 +/− 0.005 |
| C | 1.350 +/− 0.010 |
| D | 1.216 +/− 0.010 |
| E | 0.100 +/− 0.012 |
| F | 0.100 +/− 0.012 |
| G | 1.800 +/− 0.012 |
| H | 1.800 +/− 0.012 |
| I | 0.100 +/− 0.012 |
| J | 0.180 +/− 0.004 |
| K | 0.062 +/− 0.004 |
| L | 0.100 +/− 0.004 |

The dual-microprocessor module is specified to operate at a temperature of between 0° C. and 75° C., with each Pentium™ microprocessor having a thermal resistance value (Θjc) of 1.2° C./W. At 6–9 W average power, the average and maximum junction-to-case temperature rises (ΔTjc) are 7.2 and 10.8° C., respectively.

Other embodiments are within the scope of the following claims. For example, it may be possible to achieve benefits similar to those described herein using more than two microprocessors in a package.

What is claimed is:

1. A dual-microprocessor module comprising
   two microprocessors each of a kind which has two selectable modes of operation, an independent mode in which it can operate independently and a cooperative mode in which it can cooperate with another microprocessor when interconnected in a predefined way with the other microprocessor,
   conductors interconnecting the microprocessors in the predefined way for operation in the cooperative mode,
   pins for mounting the dual-microprocessor module in a socket on a circuit board, the pins being electrically connected to the microprocessors in a manner such that, when the pins are inserted into holes in the socket, in which the holes connect to runs on the circuit board and the holes and the runs are organized to accent and enable operation of a single microprocessor package, the socket accepts and enables operation of the dual-microprocessor module, without requiring rewiring of the circuit board, and
   a housing for supporting the microprocessors and the conductors, the housing being configured to extend essentially no further in any direction parallel to the circuit board than does the socket.

2. The module of claim 1 wherein the cooperative mode comprises dual processing with a shared bus.

3. The module of claim 1 wherein the cooperative mode comprises functional redundancy checking.

4. The module of claim 1 wherein each of the microprocessors comprises an Intel Pentium microprocessor.

5. The module of claim 1 wherein the conductors are part of a multilayer substrate.

6. The module of claim 1 wherein the pins comprise 347 pins.

7. The module of claim 1 wherein the pins are arranged within an area defined between the outer boundary of a smaller rectangle and the inner boundary of a larger rectangle.

8. The module of claim 7 wherein the pins include a subset of pins that is identical in function, position, and spacing to the pins of a single Pentium microprocessor package.

9. The module of claim 1 wherein some of the pins of the module are connected only to one of the microprocessors and some other pins of the module are connected only to the other one of the microprocessors.

10. The module of claim 1 wherein each of the conductors interconnecting the microprocessors is also connected to one of the pins.

11. A dual-microprocessor module comprising two Pentium microprocessors each having a cooperative mode in which it can cooperate with another Pentium microprocessor when interconnected in a predefined way with the other microprocessor, a multilayer substrate having conductors interconnecting the microprocessors in the predefined way for operation in the cooperative mode, pins for mounting the dual-microprocessor module in a socket on a circuit board, the pins being electrically connected to the microprocessors, the pins being arranged in a manner such that, when the sins are inserted into holes in the socket, in which the holes connect to runs on the circuit board the socket accepts and enables the operation of the dual-processor module or a single Pentium processor package without requiring rewiring of the connections made from the circuit board to the holes of the socket, and a housing for supporting the microprocessors and the substrate, the housing being configured to extend essentially no further in any direction parallel to the circuit board than does the socket.

12. The combination of claim 11 wherein the holes comprise 347 holes.

13. The combination of claim 11 wherein the holes are organized to accept either a single Pentium microprocessor package or a dual-Pentium microprocessor module.

14. A dual-microprocessor module comprising two microprocessors each of a kind which has two selectable modes of operation, an independent mode in which it can operate independently and a cooperative mode in which it can cooperate with another microprocessor when interconnected in a predefined way with the other microprocessor, the microprocessors being bare semiconductor dies, conductors interconnecting the microprocessors in the predefined way for operation in the cooperative mode, pins for mounting the dual-microprocessor module in a socket on a circuit board, the pins being electrically connected to the microprocessors in a manner such that, when the pins are inserted into holes in the socket, in which the holes connect to runs on the circuit board and the holes and the runs are organized to accept and enable operation of a single microprocessor package, the socket accepts and enables operation of the dual-microprocessor module, without requiring rewiring of the circuit board, and a housing for supporting the microprocessors and the conductors, the housing being configured to extend essentially no further in any direction parallel to the circuit board than does the socket.

* * * * *